I. M. UPPERCU.
SHOCK NEUTRALIZER.
APPLICATION FILED NOV. 4, 1914.
1,283,602.
Patented Nov. 5, 1918.
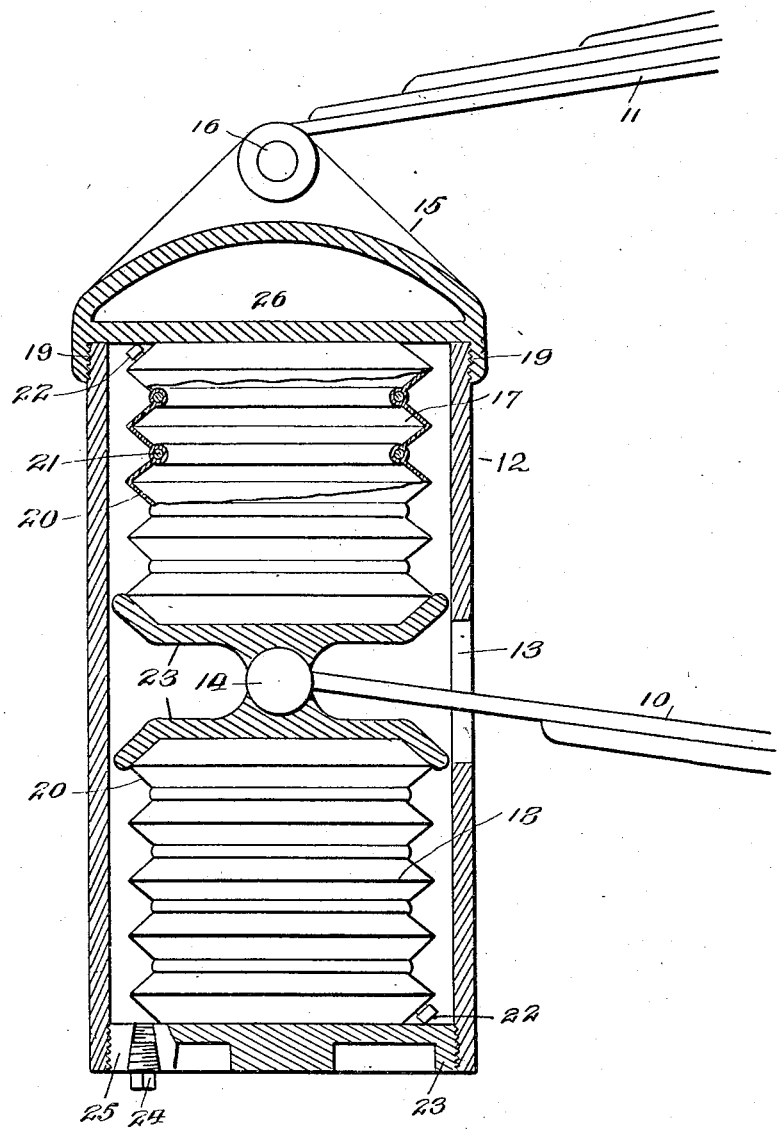
Witnesses:
Inventor,
Inglis M. Uppercu.
By his Attorney

UNITED STATES PATENT OFFICE.

INGLIS M. UPPERCU, OF NEWARK, NEW JERSEY.

SHOCK-NEUTRALIZER.

1,283,602.　　　　Specification of Letters Patent.　　Patented Nov. 5, 1918.

Application filed November 4, 1914.  Serial No. 870,302.

*To all whom it may concern:*

Be it known that I, INGLIS M. UPPERCU, a citizen of the United States, and resident of Newark, in the county of Essex and State of New Jersey, have invented certain new and useful Improvements in Shock-Neutralizers, of which the following is a specification.

This invention relates to shock neutralizers and has in view the production of a shock neutralizer that is sensitive, efficient durable and easy to apply. Other objects will appear from the specification and claims and the drawing, in which the figure is a vertical section through the shock neutralizer and the springs to which it is attached.

Referring to the drawing there are shown leaf springs 10 and 11. To the latter is pivotally attached the casing 12 by means of the hinge or bolt 16. In the casing there are inclosed containers of flexible material 17 and 18 having accordion plaits 20 and strengthening rings of steel or other metal 21, embedded in the flexible material, and nozzles 22 for the purpose of inflation. Between the containers there is a partition 13 against the cup shaped parts 23 of which rest the inflated containers 17 and 18. In the center of the partition is a ball 14 attached to the leaf spring 10. The top of the casing is closed by the pointed head 15, being screw threaded on the inner side and having the bottom 26. The lower part is closed by the plate 23 having the conical set screw 24 acting in the slot 25. By means of the bottom plate 23 the tension of the elastic cushions 17 and 18 is regulated. The conical set screw 24 placed across the slot 25 holds the bottom plate 23 securely in place.

The advantages of this shock neutralizer is that it gives the perfect elastic effect of the air without the leakage which is inevitable when the air is confined inside of metal cylinders and the variation in the air pressure is produced by the movement of a piston in the cylinder.

It also avoids the use of oil or other liquid that often is used in pneumatic shock neutralizers operated by pistons.

On account of their protected position the containers 17 and 18 are not exposed to mechanical injury. The valves 22 are ordinary tire valves and cause no more leakage than such valves used on tires.

The partition 13 is shown as consisting of two separate parts. This has the advantage that it makes it very easy to insert the ball into its socket. In this case the elasticity of the containers 17 and 18 will always hold the upper and lower part of the partition close together. In place of the partition shown a partition made of one part could also be used.

It is evident that in this shock neutralizer various minor mechanical modifications may be introduced without changing the spirit of the invention. Thus the result aimed at could to some extent be obtained by the use of one elastic container instead of a plurality of containers. In such case, a movable plate would have to take the place of the partition shown. The partition could also be replaced by an end plate when a plurality of containers is used, although the use of a partition is preferred as being more efficient.

In inflating the containers 17 and 18, the pressure may be varied according to the sensitiveness desired.

What I claim as new is:

1. In a shock neutralizer, a casing, a pair of air tight containers in the casing, made of flexible material strengthened with metallic supports embedded in the material of the containers, and means for reciprocating the containers.

2. In a shock neutralizer, a casing, a pair of air tight cylindrical containers made of flexible material, located in the casing, the sides of the containers consisting of accordion plaits, the latter strengthened with metallic rings at the edges of plaits, the rings being embedded in the material of the containers, and means for inflating the container.

3. In a shock neutralizer, a casing, a pair of air tight cylindrical containers in the casing, the containers consisting of accordion plaits with metallic rings at the edges of the plaits and embedded in the material of the containers, means for inflating the containers, a partition between the containers, and means for repicrocating the containers.

Signed at New York, in the county of New York and State of N. Y.

INGLIS M. UPPERCU.

Witnesses:
C. A. O. ROSELL,
J. W. GERMAN.

Copies of this patent may be obtained for five cents each, by addressing the "Commissioner of Patents, Washington, D. C."